United States Patent [19]

Hickle

[11] 4,101,099

[45] Jul. 18, 1978

[54] REPEATABLE RELEASE HOLDBACK BAR

[75] Inventor: William H. Hickle, China Lake, Calif.

[73] Assignee: The United States of America as represented by the Secretary of the Navy, Washington, D.C.

[21] Appl. No.: 833,425

[22] Filed: Sep. 15, 1977

[51] Int. Cl.² .......................... B64F 1/06; B64F 1/12
[52] U.S. Cl. ........................................ 244/63; 403/31
[58] Field of Search .................... 244/63, 115; 403/15, 403/31, 41, 360; 285/316, 321; 92/25, 27; 60/547, 583, 591

[56] References Cited

U.S. PATENT DOCUMENTS

| 2,432,508 | 12/1947 | Cotton | 244/63 |
|---|---|---|---|
| 2,444,919 | 7/1948 | Cotton et al. | 244/63 |
| 2,449,554 | 9/1948 | Helber et al. | 244/63 X |
| 2,727,291 | 12/1955 | Hamblin | 244/63 X |
| 2,728,538 | 12/1955 | Mazis | 244/63 |
| 2,777,650 | 1/1957 | Fosness et al. | 244/63 |
| 2,783,004 | 2/1957 | Fieux | 244/63 |
| 3,062,485 | 11/1962 | Hartel | 244/63 |
| 3,370,811 | 2/1968 | Boody | 244/63 |
| 3,437,291 | 4/1969 | Bochman | 244/63 |
| 3,578,273 | 5/1971 | Mulgrave | 244/115 |
| 3,602,461 | 8/1971 | Cody et al. | 244/63 |
| 3,738,693 | 6/1973 | Loustalet | 403/15 X |
| 3,813,065 | 5/1974 | Hallesy et al. | 244/115 |
| 3,945,235 | 3/1976 | Oxlade et al. | 403/15 X |

Primary Examiner—Barry L. Kelmachter
Attorney, Agent, or Firm—R. S. Sciascia; Roy Miller; Thomas W. Hennen

[57] ABSTRACT

A holdback bar for restraining an aircraft temporarily prior to catapult assisted launch which utilizes a ball and piston unloader valve to insure rapid, positive release of a pressurized hydraulic fluid. Compensator chambers each having a resilient piston cushion against release shock caused by rapid release of stored strain energy in the hydraulic fluid and provide hydraulic fluid make-up to allow for expansion and contraction and slight leakage losses.

5 Claims, 1 Drawing Figure

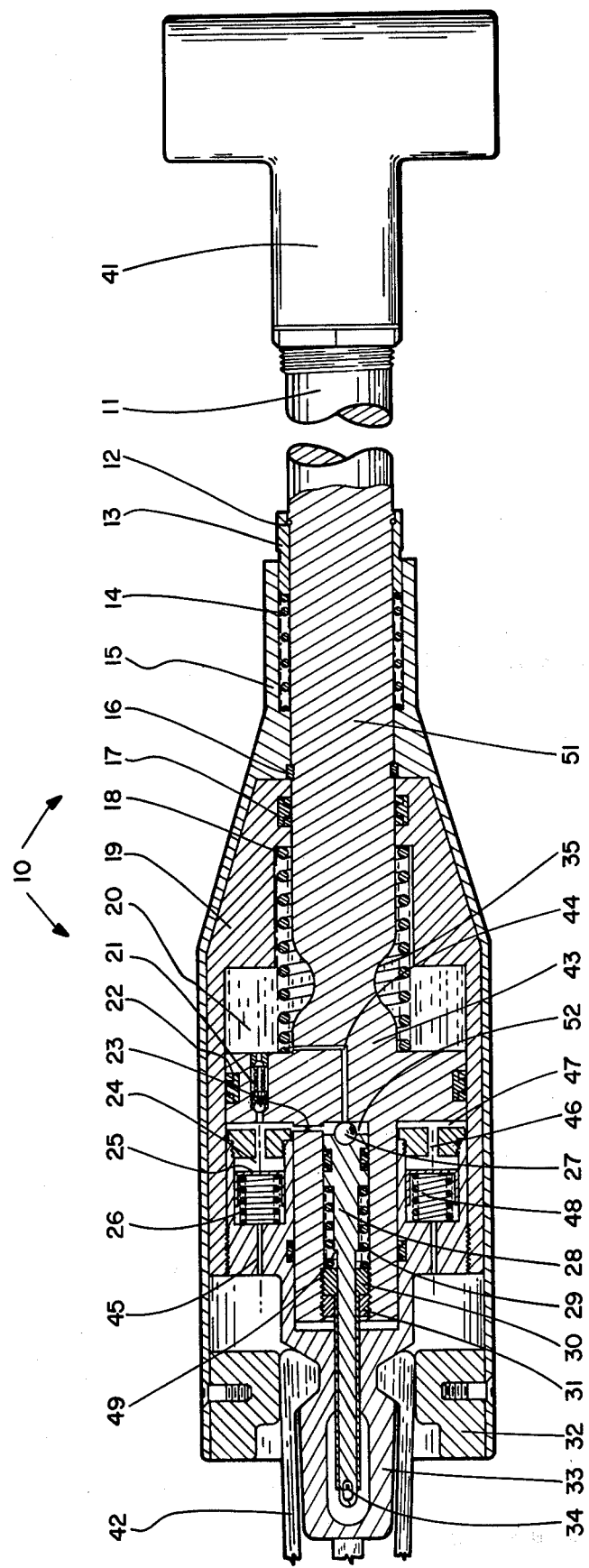

REPEATABLE RELEASE HOLDBACK BAR

BACKGROUND OF THE INVENTION

1. Field of the Invention

This invention pertains to holdback bars, and more particularly to hydraulic holdback bars.

2. Description of the Prior Art

Catapult assisted launches of aircraft from modern aircraft carrier decks or other short runways require that the aircraft be restrained against engine thrust and catapult force as the engines are brought up to full take off power and as the pressure in the catapult is increased to that pressure required for a safe launch. The holdback bar must release the aircraft when a pre-determined combined force has been reached, and the holdback bar should be immediately reusable for additional launches of other aircraft.

Prior holdback bars are typified by U.S. Pat. No. 3,578,273 to Thomas P. Mulgrave, dated May 11, 1971, and U.S. Pat. No. 3,813,065 to Harold W. Hallesy et al. dated May 28, 1974. In Hallesy et al. a mechanical holdback bar utilizes a locking ring and other structure to trigger release at a pre-determined combined aircraft engine thrust and catapult force level.

Mulgrave discloses a hydraulic holdback bar utilizing a plunger and housing to compress a fluid, and a spring loaded ball valve for releasing the pressurized fluid at the point when force from fluid pressure acting over the area of the ball exceeds the spring force holding the ball in the closed position. Fluid escaping from the pressure chamber flows through the valve to a receiving chamber and enables relative movement between the housing and plunger to trigger release of the aircraft. The spring loaded ball valve disclosed operates as a pressure regulator, and only permits fluid to escape the pressure chamber so long as the pressure in that chamber exceeds a pre-determined amount.

Other holdback bars utilize a tensile failure member which is expended during a single launch and which must be replaced for each additional launch. A supply of tensile links must be maintained on the flight deck for use in launching operations, and pieces of expended links may clutter the deck area. Such expended links may pose a clutter hazard to personnel and could be ingested by operating jet engines, resulting in severe engine damage. Also, time and labor is required after each launch to replace the expended tensile link. Tensile failure holdback bars also provide an instantaneous release which causes very high stresses in the nose gear and related aircraft structure.

SUMMARY OF THE INVENTION

The present invention overcomes the problems of the prior art by providing within a hydraulic holdback bar a ball and piston unloader valve which operates positively and rapidly to completely release fluid from a pressure chamber to trigger operation of the bar and release of the aircraft. Fluid pressure from the pressure chamber is applied through a passageway to the face of a ball which is resiliently held in place against the fluid passageway by a spring biased piston. As fluid pressure reaches a pre-determined level and is adequate to force the ball from its seat over the passageway, fluid flows around the ball and applies fluid pressure to the larger face of the spring biased piston. Fluid pressure over the larger piston area forces the piston to the full open position permitting the ball to move well away from the passageway, fully opening the passageway to fluid flow even if pressure in the pressure chamber subsequently drops.

Fluid entering the unloader chamber continues through a restricted passageway which provides a gradual reduction of pressure to the receiving chamber which increases in volume as the plunger moves relative to the housing during sequencing of the holdback bar. A compensator chamber communicates with the receiving chamber and absorbs any changes in fluid volume due to heating from fluid friction of pressurization. In the present invention the unloader valve defined by the spring biased piston and ball releases positively and rapidly to enable clean release of the aircraft.

BRIEF DESCRIPTION OF THE DRAWING

Further advantages of the present invention will emerge from a description which follows of the preferred embodiment of a hydraulic repeatable release holdback bar, given with reference to the accompanying drawing which is a side view partially in section along the longitudinal axis of a holdback bar.

DESCRIPTION OF THE PREFERRED EMBODIMENT

Referring now to the drawing wherein there is snown generally holdback bar 10 having housing 19 and plunger 51. Plunger 51 is made up of shank 11 and head 43. Shank 11 is connected to crossbar 41 which cooperates with hooks (not shown) on the runway surface to anchor holdback bar 10. Shank 11 also includes tensile failure section 35 which serves as a fail safe release of bar 10 by allowing collet body 33 to withdraw from collet ring 32 releasing hooks 42 when shank 11 parts at section 35.

Snap ring 12 retains spring retainer 13 in position to hold spring 14 tensioned, thereby maintaining collet slide 15 against load ring 16. Restrained in this manner, collet slide 15 moves longitudinally along shank 11 under the influence of spring 14. Seal 17 prevents leakage of hydraulic fluid from pressure chamber 20 along shank 11. Return spring 18 bears against housing 19 and plunger head 43 to maintain housing 19 against load ring 16 while holdback bar 10 is unloaded. Seal 22 prevents leakage from pressure chamber 20 forward to receiving chamber 47.

Holdback bar 10 is attached to hooks 42 which are permanently attached to an aircraft. Hooks 42 engage collet body 33 and are held in position by collet ring 32 on collet slide 15.

Hydraulic fluid within pressure chamber 20 communicates through passageway 44 to sphere 27 which is held in position closing passageway 44 by unloader piston 28. Piston 28 resiliently bears against sphere 27 under the urging of spring 29. Spring 29 preload is adjusted by threaded bushing 30 for the desired release point. Locking bushing 31 maintains the adjustment on bushing 30. Unloader piston 28 may be manually operated by inserting a suitable tool in opening 34 and prying unloader piston 28 away from passageway 44.

Fluid flowing past sphere 27 encounters unloader chamber 52 and bears against the face of unloader piston 28 bottoming shoulder 49 against adjusting nut 30. Fluid then seeks to escape unloader chamber 52 through flow restrictor 23 and eventually flows to receiving chamber 47.

Compensator piston 25 is resiliently biased by compensator piston spring 26. Compensator chamber 24 thus has a variable volume which will accomodate thermal expansion or contraction of hydraulic fluid to enable use of holdback bar 10 within temperature extremes of −65° to +150° F. Compensator chamber 24 communicates with receiving chamber 47 through orifices 46. Air or hydraulic fluid trapped beneath compensator piston 25 is vented from chamber 48 through passageway 45. After release of an aircraft, return spring 18 returns housing 19 to its original position relative to plunger 51 and hydraulic fluid within receiving chamber 47 returns to pressure chamber 20 through check valve 21.

In operation, holdback bar 10 is first attached to aircraft hooks 42 by manually moving collet slide 15 toward cross-bar 41 to expose collet body 33. Collet body 33 is then engaged between hooks 42 and collet slide 15 allowed to return by force from spring 14 to its locked position causing collet ring 32 to bear against the sides of hooks 42. The aircraft then taxies along the take-off surface until hooks on the take-off surface (not shown) engage cross-bar 41. At this point the catapult shuttle is attached to the aircraft and begins to apply forward thrust. Also the aircraft engines are brought up to take-off power and held there.

As the catapult force increases, tensile forces applied to housing 19 by collet body 33 and to plunger 51 by cross-bar 41 cause pressurization of hydraulic fluid within pressure chamber 20. As the catapult force on the aircraft reaches a pre-determined level the fluid pressure within pressure chamber 20 and passageway 44 causes sphere 27 to lift from its seat opening passageway 44. At this moment pressurized fluid flows into unloader chamber 52 and acts against the full face of unloader piston 28. Unloader piston bias spring 29, which was selected and adjusted to hold sphere 27 against passageway 44 until a pre-determined pressure within passageway 44 acting against sphere 27 was achieved, now is inadequate to hold unloader piston 28 because fluid pressure operates against a much larger area over the face of piston 28 and forces piston 28 to bottom shoulder 49 against adjusting nut 30. In this way, sphere 27 is completely removed from its position obstructing flow through passageway 44.

Hydraulic fluid pressurized in pressure chamber 20 was slightly compressed because of the high pressure existing there and when released expands to its original volume. This expansion is accomodated by compensator chamber 24 and compensator piston 25.

As hydraulic fluid exits pressure chamber 20, plunger head 43 moves relative to housing 19 and the volume within pressure chamber 20 decreases. A corresponding increase in volume in receiving chamber 47 occurs simultaneously. As housing 19 moves relative to plunger 51, collet body 33 is extended beyond collet ring 32. When collet body has moved approximately 1.1 inches relative to collet ring 32, hooks 42 are no longer locked in position and lose their grasp of collet body 33 thereby releasing the aircraft to begin its take-off run under full engine power and maximum catapult thrust.

Although the preferred embodiment has been described it will be understood that within the purview of this invention various changes may be made in the form, details, proportion and arrangement of parts, the combination thereof, and mode of operation, which generally stated results in a device capable of carrying out the features set forth as disclosed and defined in the appended claims.

What is claimed is:

1. In a repeatable release holdback bar of the type used for temporarily restraining an aircraft against the combined forces of engine thrust and catapult force prior to a catapult assisted launch of said aircraft, wherein said holdback bar has means for attachment to a runway surface and means for releasable attachment to said aircraft, and has a housing and a central plunger operative within said housing to pressurize a fluid in a pressure chamber in response to said combined forces, and has means for venting said fluid from said pressure chamber into a separate receiving chamber in response to a predetermined combined force level to enable relative motion between said plunger and housing for triggering release of said aircraft, and has means for returning said fluid from said receiving chamber to said pressure chamber to reset said holdback bar for additional launches, the improvement comprising:

said plunger defining a bore separate from said pressure chamber and said receiving chamber;

a piston sealingly slidable within said bore between closed and open positions, and resiliently biased toward said closed position;

said piston and bore defining an unloading chamber; said venting means comprising said plunger defining a first passageway communicating between said pressure chamber and said unloading chamber, and a second passageway communicating betwen said unloading chamber and said receiving chamber; and a sphere contained within said unloading chamber and cooperating with said piston in said closed postion to seal said first passageway.

2. The improved repeatable release holdback bar as set forth in claim 1 wherein said plunger defines a flow restrictor in said second passageway for controlling the rate of fluid flow from the pressure chamber and thereby controlling the relative rate of motion between said plunger and said housing.

3. The improved repeatable release holdback bar as set forth in claim 1 wherein said housing defines at least one compensator chamber communicating with said receiving chamber, and having a closely fitting resiliently biased compensator piston dividing said compensator chamber into a fluid chamber and a dry chamber, for resiliently absorbing changes in fluid volume caused by heating of the fluid by the strain energy released from said pressurized fluid.

4. The improved repeatable release holdback bar as set forth in claim 1 wherein said piston includes means for manually displacing said piston from said closed position to said open position.

5. The improved repeatable release holdback bar as set forth in claim 3 wherein said housing defines a venting passage communicating between the outside of said housing and the dry chamber of said compensator chamber.

* * * * *